(12) United States Patent
Blach et al.

(10) Patent No.: US 6,196,711 B1
(45) Date of Patent: Mar. 6, 2001

(54) MACHINE FOR CONTINUOUS PROCESSING OF FLOWABLE MATERIALS

(76) Inventors: Josef A. Blach; Michael Blach; Markus Blach, all of Hoher Steg 10, D-74348 Lauffen (DE)

( * ) Notice: Subject to any disclaimer, the term of this patent is extended or adjusted under 35 U.S.C. 154(b) by 0 days.

(21) Appl. No.: 09/220,166

(22) Filed: Dec. 23, 1998

(30) Foreign Application Priority Data

Oct. 13, 1998 (DE) .............................................. 198 47 102

(51) Int. Cl.[7] .................................................. B29B 7/46
(52) U.S. Cl. .................................................. 366/83; 366/85
(58) Field of Search .................................. 366/76.1, 76.6, 366/76.93, 83–85, 92–95; 425/204, 208, 209

(56) References Cited

U.S. PATENT DOCUMENTS

| | | |
|---|---|---|
| 3,078,824 | 2/1963 | Bechle . |
| 3,802,670 | 4/1974 | Okada et al. . |
| 4,581,264 | * 4/1986 | Emery et al. . |
| 4,591,487 | * 5/1986 | Fritsch . |
| 5,462,426 | * 10/1995 | Imamura . |
| 5,836,682 | 11/1998 | Blach . |

FOREIGN PATENT DOCUMENTS

| | | |
|---|---|---|
| 0 422 272 | 4/1991 | (EP) . |
| 0 788 867 | 8/1997 | (EP) . |
| 01241423 | 9/1989 | (JP) . |

* cited by examiner

Primary Examiner—Tony G. Soohoo
(74) Attorney, Agent, or Firm—Flynn, Thiel, Boutell & Tanis, P.C.

(57) ABSTRACT

A machine for continuous processing of flowable materials has at least one shaft (4) with worm or similar processing elements (9, 15, 16). The housing (1) has at least one material inlet (14) at one end and at least one material outlet at the other end. The housing (1) is further provided with a flange (22) to which the driving member (8) is fastened with tension rods (28). The flange (22) is disposed so as to form between it and the driving member (8) a housing portion (13) with the material inlet (14) which is largely relieved of tensile forces. In order to also relieve the housing portion (13) of torques, the flange (22) is in addition connected so as to rotate in unison with a frame (27) to which the driving member (8) is fastened.

22 Claims, 2 Drawing Sheets

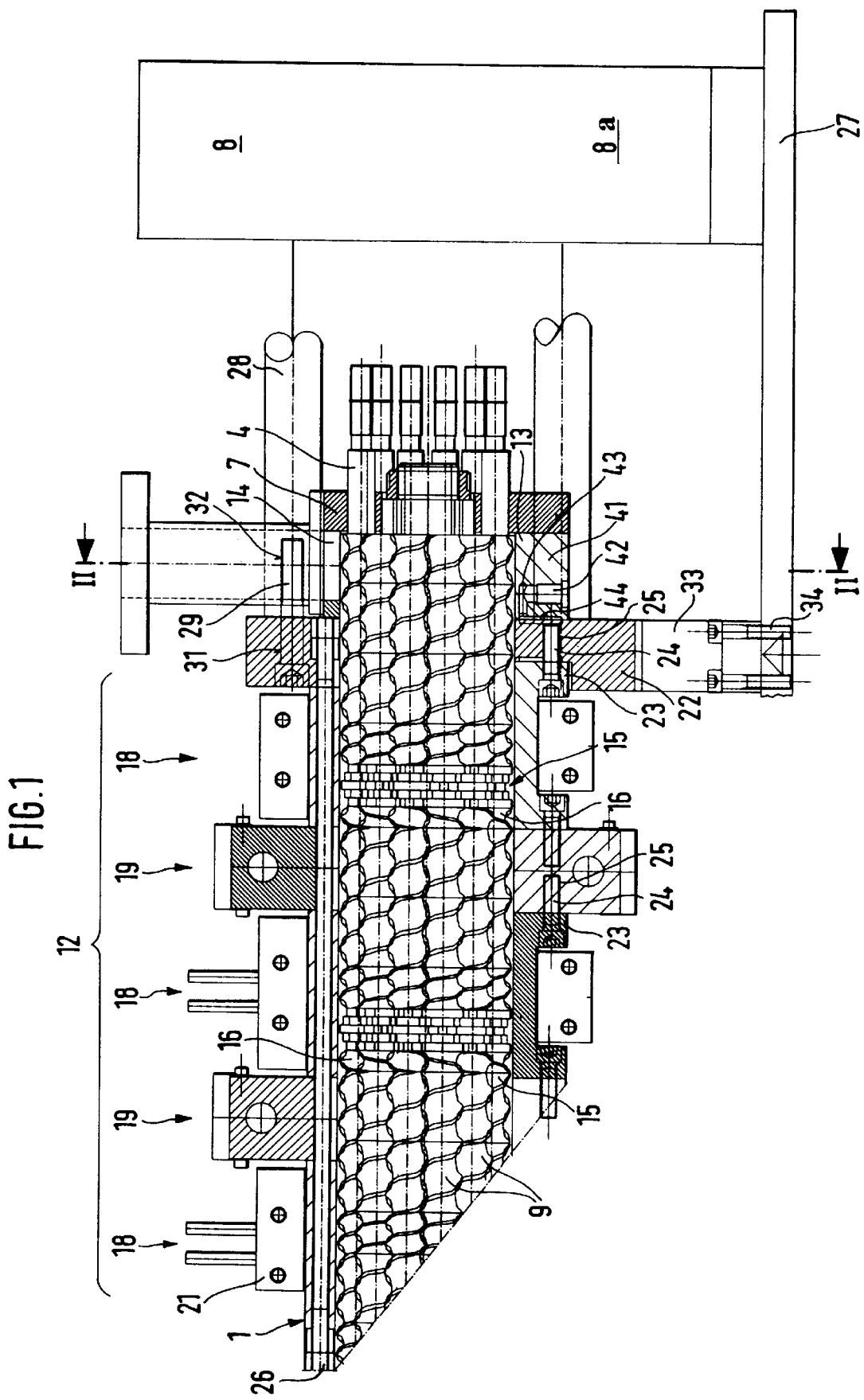

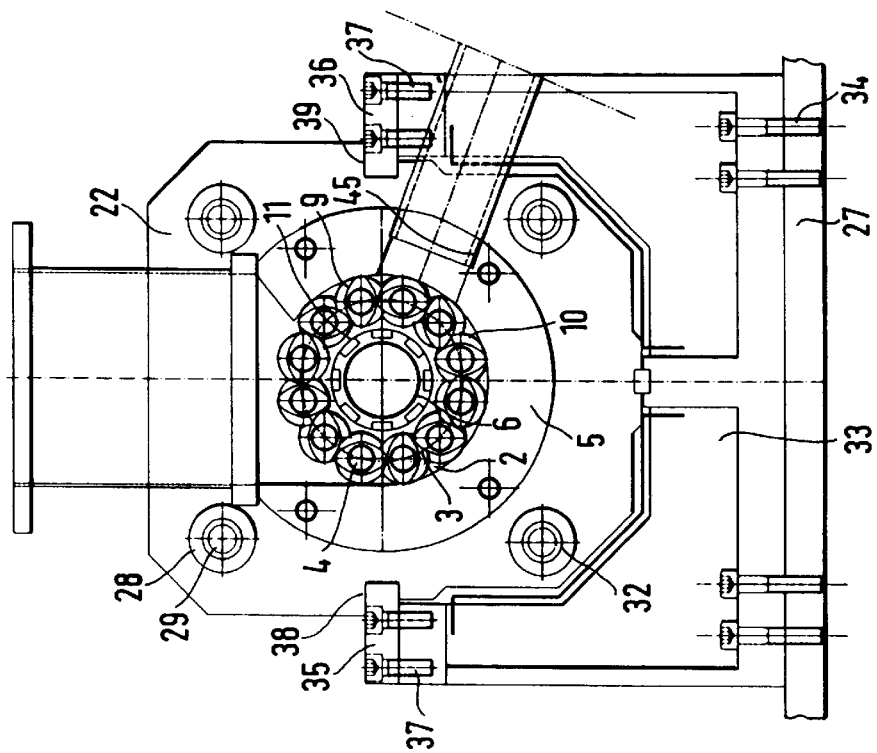
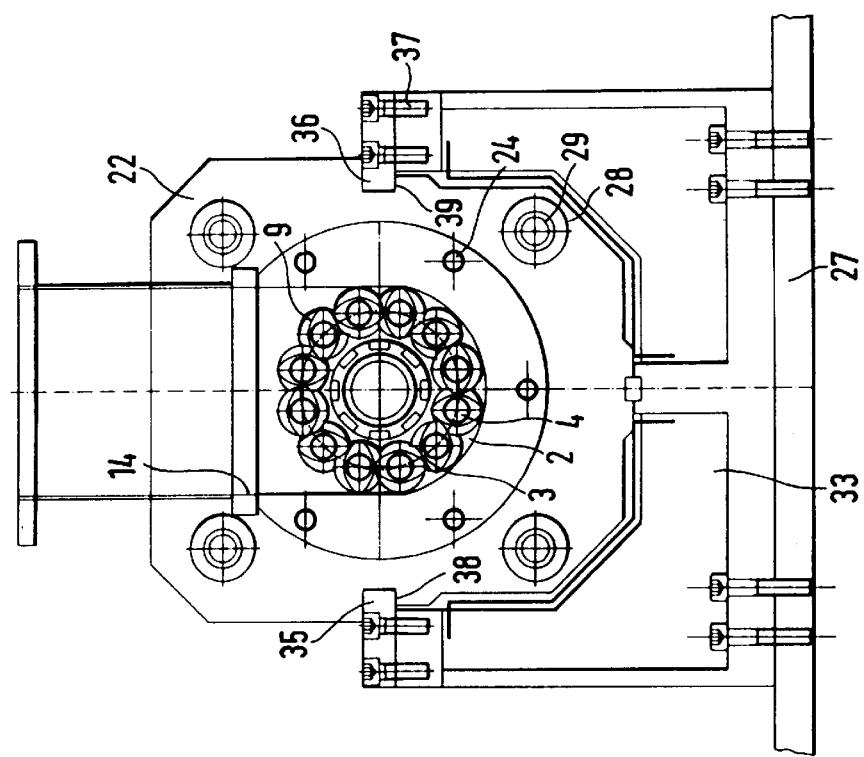

MACHINE FOR CONTINUOUS PROCESSING OF FLOWABLE MATERIALS

FIELD OF THE INVENTION

This invention relates to a machine for continuous processing of flowable materials.

BACKGROUND OF THE INVENTION

A machine for processing flowable materials is known e.g. from EP 0 788 867 A1. A plurality of axis-parallel shafts driven in the same direction and disposed at the same central-angle distance are disposed in a space in the housing along a circle, each of which bears a number of worm or similar processing elements disposed axially one behind the other with which adjacent shafts intermesh tightly. The housing is provided on the radially inward and outward sides of the space with axis-parallel grooves shaped like segments of a circle for receiving and guiding the particular shaft with its processing elements.

The flange to which the tension rods are fastened is formed by an end plate which seals the housing on the side facing the driving member and through which the shafts extend to the driving member. This ensures that the considerable tensile and torsional forces occurring in the housing during processing of the flowable material flow via the housing into the driving member and are received thereby.

The housing jacket and the end plate must therefore be of accordingly massive design. The housing wall is weakened by the material inlet. In the known machine, the opening must thus either be smaller than desired or the housing wall thicker. The thick housing wall means not only greater production expense but also an increase in the energy expense for heating and cooling.

The material added via the material inlet generally has a solid, powdery form. It must plasticize only when it has been conveyed by the worm elements out of the area of the material inlet into the closed housing area. It is therefore frequently necessary to cool the housing greatly in the area of the material inlet. This is also opposed by the thick housing jacket.

SUMMARY OF THE INVENTION

The purpose of the invention is to eliminate the disadvantages of the thick housing wall of the known machine without additional expense.

This is attained according to the invention by disposing the flange attacked by the driving member with tension rods on the side of the material inlet facing the material outlet. That is, the housing portion with the material inlet is located between the flange and the driving member according to the invention. The tensile forces arising in the housing during processing of the material thus flow via the flange into the driving member so as to avoid the housing portion with the material inlet. The flange is preferably in addition connected to a frame to which the driving member is fastened in order to also sink the torque occurring in the housing during processing of the flowable material via the flange into the driving member so as to avoid the housing portion with the material inlet.

Since no appreciable axial or torsional forces thus attack the housing portion with the material inlet in the inventive machine, this portion can be formed with low strength and thus be modified in a great variety of ways.

Thus, it is possible to essentially reduce the wall thickness of this housing portion, the consequence being for example that the housing portion with the material inlet can be cooled much more easily with much less energy. In addition, the contact surface between the housing portion with the material inlet and the rest of the housing can be reduced to a minimum, thereby permitting the housing portion with the material inlet to be insulated very largely from the rest of the housing. This means for example that the rest of the housing can be heated much more easily with less energy.

In addition, the material inlet can be formed with virtually any desired size. Also, any desired number of material inlets can be provided in this portion.

The inventive machine can be formed as a one-, two- or multi-shaft machine. In a preferred embodiment, however, it is formed in accordance with EP 0 788 867 A1. That is, the housing has a space in which axis-parallel shafts driven in the same direction are disposed along a circle with the same central-angle distance, each of which bears a number of worm or similar processing elements disposed axially one behind the other with which adjacent shafts intermesh tightly, the housing being provided on the radially inward and outward sides of the space with axis-parallel concave channels shaped like segments of a circle for receiving and guiding the particular shaft with its processing elements.

In such a machine the material is deflected radially from one direction in the other whenever it passes between the processing elements of two adjacent shafts. This means that the solid powdery material is separated from air and other gases or volatile substances in the housing portion in the area of the material inlet. In order to remove the separated gases one therefore preferably provides on the housing portion with the material inlet according to the invention at least one gas outlet, to which gas suction means can be connected. Thus, the inventive machine can also be used to process very finely powdered light materials with an accordingly high air or gas component.

BRIEF DESCRIPTION OF THE DRAWINGS

An embodiment of the inventive machine will be explained in more detail below with reference to the drawing, in which:

FIG. 1 shows a longitudinal section through the part of the machine facing the driving member;

FIG. 2 shows a section along line II—II of FIG. 1 through the housing portion with the material inlet; and FIG. 3 shows a cross section corresponding to FIG. 2 through a variant of the housing portion with the material inlet.

DETAILED DESCRIPTION

According to FIGS. 1 and 2, the machine has space 2 extending along circle 3 in housing 1. In space 2 there are a plurality of axis-parallel shafts 4. Space 2 extends between the inner side of housing wall 5 and axial inside core 6.

Housing 1 is sealed with end plates on both faces, FIG. 1 showing only one end plate 7 on one housing end. Shafts 4 extending through plate 7 are driven in the same direction by driving member 8 shown schematically in FIG. 1.

Each shaft 4 bears a plurality of worm elements 9 disposed so as to rotate in unison. As indicated by FIG. 2, worm elements 9 of adjacent shafts intermesh with little play, i.e. largely tightly.

Housing wall 5 is provided on its inner side, and core 6 on its outer side, with axis-parallel concave longitudinal depressions 10, 11 shaped like segments of a circle which are engaged by worm elements 9 with little play, i.e. largely tightly.

Housing wall 5 consists of main portion 12 and portion 13 formed as a separate annular segment. Portion 13 has a material inlet 14 on the upper side through which the material to be processed (not shown) is supplied to space 2.

Shafts 4 extend from end plate 7 to the other end plate at the other housing end which is provided with the material outlet (not shown). The machine has a plurality of kneading zones 15 formed by kneading blocks on shafts 4, as known for example from EP 0 422 272 A1. On the material discharge side of the kneading blocks one can dispose retaining processing elements 16 on shafts 4. If the material to be processed is a solid thermoplastic material, for example plastic pellets, plasticization can take place in the area of kneading zones 15.

Main portion 12 of housing wall 5 consists of long and short annular housing segments 18, 19. Long housing segments 18 are provided with heaters 21 (or optionally heat sinks). Short housing segments 19 can have for example gas outlets in order to draw volatile components on the material discharge side of kneading zones 15.

Flange 22 is fastened to housing 1 between housing segment 13 with material inlet 14 and main portion 12 of housing wall 5. Flange 22 is disposed as a separate annular segment between housing segment 13 with material inlet 14 and first long housing segment 18.

Short and long segments 18, 19 and flange segment 22 are held together for example by flanges 23 at the ends of long segments 18 and screws 24 screwed through holes in flanges 23 into threaded holes 25 in short segments 19 as shown in the bottom of FIG. 1. Alternatively as shown in the top of FIG. 1, by pull rods 26 extend through corresponding bores in housing wall portion 12, i.e. long and short segments 18, 19, and attacking the end plate (not shown) at the material-discharge end of the housing, on the one hand, and flange segment 22, on the other hand, with corresponding prestress.

The considerable tensile forces, arising in particular due to the fact that the material to be processed is conveyed by worm elements 9, compacted in kneading zones 15 with retaining processing elements 16 and finally pressed through the material outlet and optionally an extrusion tool, are guided according to the invention via main portion 12 of housing wall 5 into flange 22. Flange 22 is connected to a housing 8a of driving member 8 that is mounted to static frame 27. For this purpose, driving member housing 8a is connected with flange 22 by tension rods 28, tension rods 28 being fastened to flange 22 by screws 29 extending through screw holes 31 in flange 22 and screwed into threaded axial bore 32 in tension rods 28.

In order to also receive the torque attacking housing wall 5 during material processing, flange 22 is fixedly connected to frame 27. According to FIG. 2, flange 22, which has a substantially rectangular or prismatic circumference, is fastened for this purpose in an accordingly formed recess on pillar 33 fastened to frame 27 with screws 34. Pillar 33 has wedges 35, 36 fastened thereto with screws 37 on opposite sides of flange 22 which engage corresponding recesses 38, 39 in the circumference of flange 22.

From FIG. 1 it can thus be observed that housing segment 13 is not connected to either the driving member housing 8a or frame 27. The tensile forces and torques arising through material processing are guided by flange 22 into driving member housing 8a or frame 27, housing segment 13 with material inlet 14 can be formed with lower strength according to the invention.

Accordingly, housing segment 13 has a much smaller wall thickness than housing wall 12 on the other side of flange 22 facing the material outlet, i.e. housing segments 18, 19.

Housing segment 13, which is in addition provided with heat sink 41 to which coolant is supplied via connection 42, is thus coolable with low energy expense. In addition, contact surface 43 with which flange segment 22 touches housing segment 13 is very small, i.e. only large enough for space 2 to be sealed reliably, so that housing segment 13 is largely insulated from flange segment 22 and thus housing wall 12 heated by heaters 21, by annular gap 44 formed between flange segment 22 and housing segment 13. Annular gap 44 can in addition be provided with a heat insulating material.

Also, material inlet 14 can be formed to be large, for example as wide as the outer diameter of space 2 with worm elements 9 (FIG. 2).

Housing segment 13 can in addition be provided with further openings, for example according to FIG. 3 with gas outlet 45 offset at an angle from material inlet 14 in order to vent air or other gases out of the powdery material supplied to the machine via material inlet 14.

What is claimed is:

1. An apparatus for continuous processing of flowable material, said apparatus comprising:
    a main housing having opposed ends and an axially extending through bore;
    at least one shaft formed with processing elements for processing the flowable material, said at least one shaft being located in the bore of said main housing and having an end section that extends out through a first end of said main housing;
    a drive unit having a static housing, wherein the end section of said at least one shaft is connected to said drive unit so that said drive unit rotates said at least one shaft;
    a flange integrally attached to the first end of said main housing, said flange being connected to a static frame and to said drive unit housing and having an exposed face directed towards said drive unit housing; and
    a housing end segment located adjacent the exposed face of said flange, wherein said at least one shaft extends through said housing end segment and said housing end segment is formed to have an inlet opening that is open towards said at least one shaft.

2. The apparatus of claim 1, wherein said flange is formed separately from said main housing and is rigidly secured to said main housing.

3. The apparatus of claim 2, wherein said flange and said main housing are connected by a plurality of pull rods.

4. The apparatus of claim 1, wherein the static frame extends from said drive unit housing and said flange is attached to said static frame.

5. The apparatus of claim 4, wherein said drive unit housing is attached to said frame.

6. The apparatus of claim 1 wherein: a pillar is attached to said static frame; said flange is seated on said pillar; said pillar is provided with at least one wedge and said flange is formed with at least one recess and said flange is arranged on said pillar so that said wedge seats in the recess to prevent rotation of said flange relative to said pillar.

7. The apparatus of claim 1, wherein: said main housing has a circumferential wall that has a first thickness; and said housing end segment has a circumferential wall that has a second thickness, the second thickness being less than the first thickness.

8. The apparatus of claim 7, wherein said housing end segment is provided with a cooling means.

9. The apparatus of claim 1, wherein said housing end segment is provided with a cooling means.

10. The apparatus of claim 9, wherein said housing main section is provided with a heating means.

11. The apparatus of claim 1, wherein: a plurality of said shafts are disposed in said main housing and extend through said housing end segment; said shafts are arranged in a circle and are positioned so that said processing elements of adjacent shafts intermesh.

12. The apparatus of claim 11, wherein said housing end segment is formed with a gas outlet.

13. The apparatus of claim 11, wherein a core is disposed in the main housing bore and said shafts surround said core.

14. The apparatus of claim 1, wherein said housing end segment is formed with a gas outlet.

15. An apparatus for continuous processing of flowable material, said apparatus comprising:
   a static frame;
   a main housing located above said frame, said main housing having opposed ends and an axially extending through bore;
   at least one shaft formed with processing elements for processing the flowable material, said at least one shaft being located in the bore of said main housing and having an end section that extends out through a first end of said main housing;
   a drive unit that is attached to said frame, wherein the end section of said at least one shaft is connected to said drive unit so that said drive unit rotates said at least one shaft;
   a flange integrally attached to the first end of said main housing, said flange being secured directly to said frame so as to be rigidly connected to said drive unit and having an exposed face directed towards said drive unit housing; and
   a housing end segment located adjacent the exposed face of said flange, wherein said at least one shaft extends through said housing end segment and said housing end segment is formed to have an inlet opening that is open towards said at least one shaft.

16. The apparatus of claim 15, wherein said flange is formed separately from said main housing and is rigidly secured to said main housing.

17. The apparatus of claim 15, wherein: a pillar extends upwardly from said frame and is rigidly connected to said frame; and said flange is seated on said pillar and is connected to said pillar so as to be blocked from rotation relative to said pillar.

18. The apparatus of claim 15, wherein: said main housing has a circumferential wall that has a first thickness; and said housing end segment has a circumferential wall that has a second thickness, the second thickness being less than the first thickness.

19. The apparatus of claim 18, wherein said main housing is provided with a heating means and said housing end section is provided with a cooling means.

20. The apparatus of claim 15, wherein: a plurality of said shafts are disposed in said main housing and extend through said housing end segment.

21. The apparatus of claim 20, wherein a core is disposed in the main housing bore and said shafts surround said core.

22. The apparatus of claim 15, wherein said housing end segment is formed with a gas outlet.

* * * * *